United States Patent
Zambano et al.

(10) Patent No.: US 9,984,713 B1
(45) Date of Patent: May 29, 2018

(54) HEAT ASSISTED MAGNETIC RECORDING MEDIA WITH ENHANCED TUNING EXCHANGE COUPLING

(71) Applicant: Seagate Technology LLC, Cupertino, CA (US)

(72) Inventors: Antonio Javier Zambano, San Jose, CA (US); Connie Chunling Liu, San Jose, CA (US); Xiaoding Ma, Fremont, CA (US); ZhaoHui Fan, Fremont, CA (US); Jerry Kueirweei Chour, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/615,782

(22) Filed: Jun. 6, 2017

(51) Int. Cl.
| | |
|---|---|
| *G11B 5/716* | (2006.01) |
| *G11B 5/65* | (2006.01) |
| *G11B 5/66* | (2006.01) |
| *G11B 5/706* | (2006.01) |
| *G11B 5/712* | (2006.01) |
| *G11B 5/73* | (2006.01) |
| *G11B 5/852* | (2006.01) |
| *G11B 5/82* | (2006.01) |

(52) U.S. Cl.
CPC .............. *G11B 5/716* (2013.01); *G11B 5/656* (2013.01); *G11B 5/66* (2013.01); *G11B 5/70621* (2013.01); *G11B 5/70626* (2013.01); *G11B 5/712* (2013.01); *G11B 5/7325* (2013.01); *G11B 5/852* (2013.01); *G11B 5/82* (2013.01)

(58) Field of Classification Search
None
See application file for complete search history.

(56) References Cited

U.S. PATENT DOCUMENTS

| | | |
|---|---|---|
| 7,521,137 B2 | 4/2009 | Hohlfeld et al. |
| 8,460,805 B1 | 6/2013 | Gao et al. |
| 8,685,547 B2 | 4/2014 | Bian et al. |
| 8,988,976 B2 | 3/2015 | Chen et al. |
| 9,177,585 B1 | 11/2015 | Seki et al. |
| 9,224,411 B1 | 12/2015 | Gao et al. |
| 9,349,402 B2 | 5/2016 | Chen et al. |
| 9,520,151 B2 | 12/2016 | Qui et al. |
| 9,558,777 B2 | 1/2017 | Hellwig et al. |
| 9,697,859 B1 | 7/2017 | Tripathy et al. |
| 2001/0051287 A1 | 12/2001 | Kikitsu et al. |
| 2007/0048552 A1 | 3/2007 | Soeya |
| 2009/0081484 A1 | 3/2009 | Watanabe |
| 2009/0197119 A1* | 8/2009 | Kong et al. ............. G11B 5/66 428/800 |
| 2009/0226762 A1 | 9/2009 | Hellwig et al. |
| 2010/0182714 A1 | 7/2010 | Kanbe et al. |
| 2011/0235205 A9 | 9/2011 | Lu et al. |
| 2013/0235491 A1 | 9/2013 | Mosendz et al. |
| 2016/0148632 A1 | 5/2016 | Hellwig et al. |
| 2016/0225394 A1 | 8/2016 | Moriya et al. |

\* cited by examiner

*Primary Examiner* — Craig A. Renner

(57) ABSTRACT

An apparatus is disclosed. The apparatus includes a storage layer, a first write layer, and a second write layer. The first write layer is disposed over the storage layer. The second write layer is disposed over the first write layer. The anisotropy field and magnetization associated with the second write layer at writing temperature is greater than anisotropy field and magnetization associated with the first write layer at the writing temperature.

21 Claims, 14 Drawing Sheets

HEAT ASSISTED MAGNETIC RECORDING MEDIA WITH ENHANCED TUNING EXCHANGE COUPLING

SUMMARY

Provided herein is heat assisted magnetic recording (HAMR) media to store information. The apparatus includes a storage layer, a first write layer, and a second write layer. The first write layer is disposed over the storage layer. The second write layer is disposed over the first write layer. The anisotropy field and magnetization associated with the second write layer at writing temperature is greater than anisotropy field and magnetization associated with the first write layer at the writing temperature.

These and other features and advantages will be apparent from a reading of the following detailed description.

DESCRIPTION

Figure 1A:
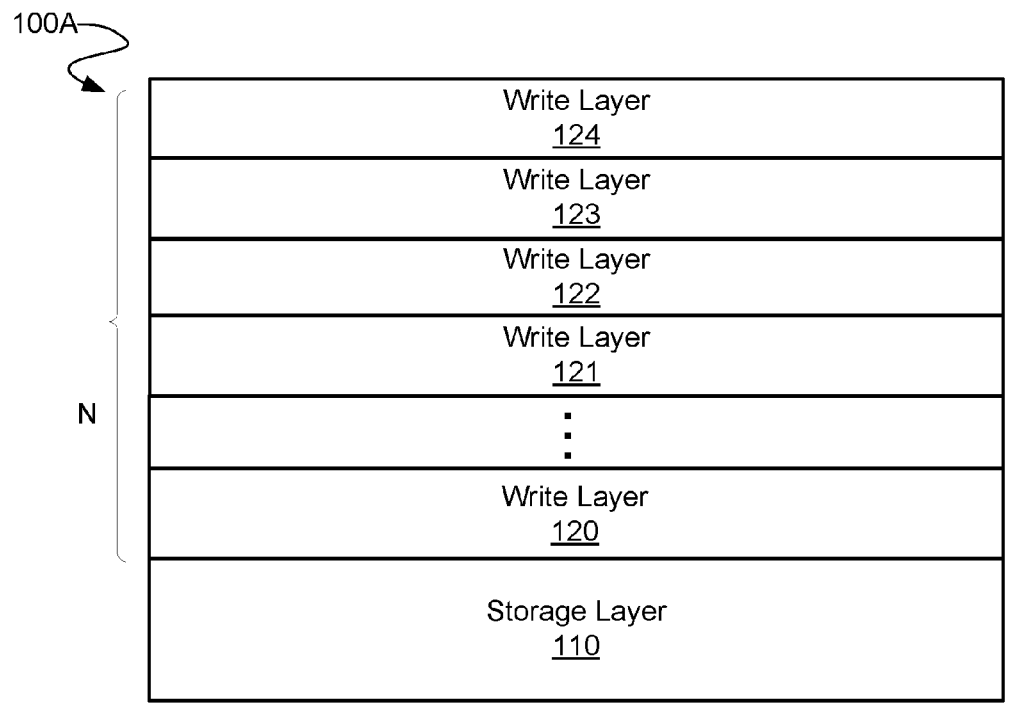
FIGS. 1A-1C show a heat assisted magnetic recording (HAMR) media and performance thereof according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It is understood heat assisted magnetic recording (HAMR) media may include both granular magnetic layers and continuous magnetic layers. Granular layers include grains that are segregated in order to physically and magnetically decouple the grains from one another. Segregation of the grains may be done, for example, with formation of oxides at the boundaries between adjacent magnetic grains. As such, the segregated magnetic grains form a granular layer. When multiple granular layers stacked together they form a columnar structure, where the magnetic alloys are hetero-epitaxially grown into columns while the oxides segregate into grain (column) boundaries. HAMR media may include both granular layers and continuous layers. In various embodiments, continuous layers include zero or much less segregation materials than found in the granular layers.

As the technology of HAMR media reaches maturity, it becomes increasingly difficult to continue to increase the storage capacity of recording media (e.g. disk drive disks) or to reduce the size of recording media while maintaining storage capacity. Such challenges may be overcome by increasing the bit density on the recording media. However, increasing the bit density can decrease the signal to noise ratio ("SNR") below acceptable levels and increase the instability of the magnetic recording process. Presence of noise can be mitigated by improving exchange coupling composite (ECC), at the writing temperature, between the write layers that is disposed over the storage layer of the HAMR media. In some embodiments, the ECC is improved by depositing a CoPt based alloy on the storage layer, e.g., FePt or FePt based alloy. In some embodiments, the ECC is further improved by inserting break layers between the write layers or a subset thereof. It is appreciated that the write layers composed of CoPt based alloy and/or break layers disposed there between creates a gradient for magnetization and anisotropy field of the write layers, at writing temperature. In some embodiments, the gradient for the magnetization and anisotropy field increases for the write layers that are further away from the storage layer in comparison to the write layers that are closer to the storage layer, at writing temperature.

The write layers have a magnetization gradient and anisotropy field gradient where the write layers further away from the storage layer have a greater than or equal to magnetization and anisotropy field of write layers closer to the storage layer, at writing temperature. As such, during the heating and the cooling process of the write process, the first layer to be magnetized in presence of the external magnetic field is the write layer furthest away from the storage layer, at writing temperature. The magnetization in the furthest write layer is fixed which subsequently assists in aligning the magnetization of lower write layers that are closer to the storage layer, at writing temperature. This process repeats itself until the magnetization in the storage layer is aligned with the external field, due to the magnetization and anisotropy field gradients of the write layers, at writing temperature. In other words, the upper write layers have a cascading effect on lower write layers due to the magnetization and anisotropy field gradient of the write layers at writing temperature, and assist in aligning the magnetization of the lower write layers and ultimately the storage layer. It is appreciated that in some embodiments, the magnetization orientation of the write layers may all align with the external magnetic field (e.g., simultaneously or over a period of time) which may subsequently assist in orienting the magnetization of the storage layer.

According to some embodiments, the break layer may include nonmagnetic material. Furthermore, it is appreciated that the break layer may partially or completely couple and decouple the write layers and the storage layer during the heating process of writing information that is followed by the cooling process. Break layers may assist in further tuning the exchange coupling composite interaction between the write layers.

Referring now to FIG. 1A, a heat assisted magnetic recording (HAMR) media 100A according to one aspect of the present embodiments is shown. The HAMR media 100A includes a storage layer 110, e.g., FePt or an alloy thereof, and multiple write layers 120, . . . , 124 disposed over the storage layer 110. In this embodiment, N write layers are shown but it is appreciated that the number of write layers are for illustrative purposes only and should not be construed as limiting the scope of the embodiments. It is appreciated that the storage layer 110 may be a continuous layer or one or more granular layers. For example, the storage layer 110 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $Ta_{O5}$, $TiO_3$, etc., or any combination thereof.

According to some embodiments, each write layer, e.g., write layer 120, . . . , 124, may include material such as CoPt or alloy thereof, or CoCrPt or alloy thereof, Co or alloy thereof, etc. In some embodiments, the write layers include CoPtX or CoFePtX, wherein X is Ta, Mo, Si, Cu, Ag, Au, Ge, Hf, Zr, Ti, V, W, Fe, Ni, Oxide, Ru, Cr, B, BN, $WO_3$, $Ta_2O_5$, $SiO_2$, $CrO_3$, CoO, TiO, etc.

It is appreciated that the write layers 120, . . . , 124 may be a continuous layer or one or more granular layers. For example, the write layer 120 may include grain decoupling material, e.g., C, carbide such as SiC, B, C, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof. Similarly, the write layers 121, . . . , 124 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof.

It is appreciated that at least two write layers have different compositions in order to create a magnetization and anisotropy field gradient, at writing temperature. For example, in some embodiments, the write layer 120 is different from the write layer 122, the write layer 120 is different from write layer 121 which are both different from the write layer 122, etc. It is appreciated that the write layers 120, . . . , 124 have a higher anisotropy field and magnetization, at writing temperature, in comparison to the storage layer 110. For example, the write layer 124, 123, . . . , 120 have higher anisotropy field and magnetization at writing temperature than the storage layer 110. The writing temperature is slightly at lower than Curie temperature and as the media is cooling off. It is appreciated that the anisotropy field and magnetization associated with the storage layer 110 is approximately zero at the writing temperature.

In some embodiments, the write layer 120, . . . , 124 form a gradient for the anisotropy field and the magnetization at writing temperature. For example, in some embodiments, the anisotropy field and the magnetization of the write layer 124 may be greater than or equal to the write layers 123, . . . , 120. Similarly, in some embodiments, the anisotropy field and the magnetization field and the magnetization of the write layer 123 may be greater than or equal to the write layers 122, . . . , 120. Similarly, in some embodiments, the anisotropy field and the magnetization field and the magnetization of the write layer 122 may be greater than or equal to the write layers 121, . . . , 120. Similarly, in some embodiments, the anisotropy field and the magnetization field and the magnetization of the write layer 121 may be greater than or equal to the N write layers and the write layer 120. In other words, the write layers 120, . . . , 124 form a anisotropy field and magnetization gradient at writing temperature. As such, in presence of an external magnetic field and at writing temperature, the write layer(s) with the higher anisotropy field and magnetization, e.g., write layer 124, aligns with the external magnetic field before other write layers, e.g., write layer 123, . . . , 120. Once the write layer 124 is aligned, it assists the external magnetic field in aligning other write layers, e.g., write layer 123. It is appreciated that the process continues until all write layers are aligned with the external magnetic field which ultimately align the storage layer 110. It is further appreciated that in some embodiments, multiple write layers may align with the external magnetic field at the same time which assist the external magnetic field to subsequently align the magnetic orientation of the storage layer with that of the external magnetic field.

When the media starts cooling down the stability and the alignment of the magnetization of the write layers and the storage layer are maintained until the freezing temperature (temperature at which the magnetization of the storage layer cannot be switched by the external magnetic field) is reached. The write layers may be chosen from material such that their magnetic properties remain substantially the same at writing temperature of the storage layer 110 therefore achieving substantial anisotropy field and magnetization variation in the system. It is appreciated that the magnetic orientation of the write layers and the magnetic orientation of the storage layer is maintained at freezing temperature, therefore retaining (storing) information therein.

It is appreciated that a thickness of the storage layer 110 may range between 1-500 Å (inclusive). In some embodiments, a thickness of each write layer, e.g., write layer 124, write layer 123, . . . , write layer 120, may range from 1-500 Å. It is appreciated that the write layers may have different thicknesses from one another. For example, a thickness of the write layer 124 may be different from the thickness of the write layer 123, etc.

Figure 1B:
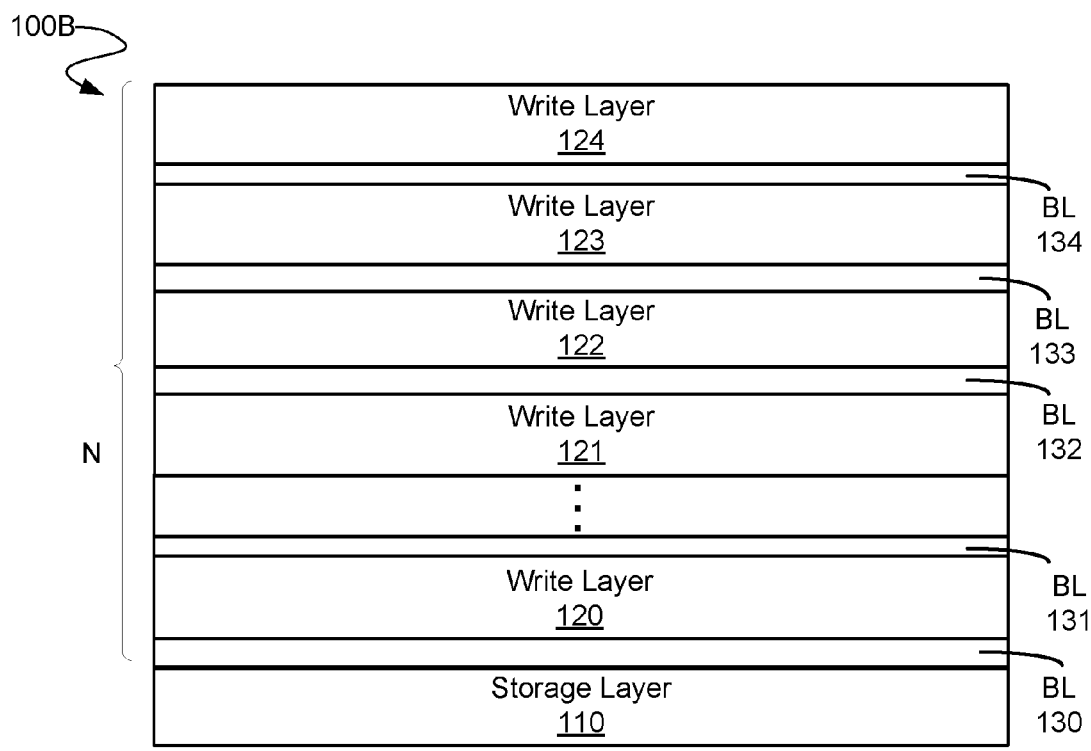

Referring now to FIG. 1B, a HAMR media 100B in accordance with one aspect of the present embodiments is shown. The HAMR media 100B is substantially similar to that of FIG. 1A. In embodiment 100B, the write layers 120, . . . , 124 are separated from one another as well as the storage layer 110 using break layers 130, 131, 132, 133, and 134. For example, the storage layer 110 may be separated from the write layer 120 via the break layer 130. Moreover, the write layer 120 may be separate from other write layers via the break layer 131. Similarly, the write layer 121 may be separated from the write layer 122 via the break layer 132, etc.

It is appreciated that the break layers may be nonmagnetic according to some embodiments. For example, the break layers 130, . . . , 134 may include FeX, wherein X is Co, Cr, Oxide, Ru, Cu, Pt, Cr, BN, Nitride, C, B, etc., and where the composition of X is selected such that FeX is nonmagnetic. In some embodiments, the break layers may include FeCoX where X is Cr, Ru, Cu, Pt, Cr, BN, Oxide, Nitride, C, B, etc., where the composition of X is selected such that FeCoX is nonmagnetic. In some embodiments, the break layers 130, . . . , 134 may be nonmagnetic and it may include CoX where X is Fe, Cr, Oxides, Ru, Cu, Pt, C, BN, Cr, etc., and where X is selected such that the alloy is nonmagnetic. It is appreciated that in some embodiments, the break layers 130, . . . , 134 may be slightly magnetic relative to the surrounding layers, at the writing temperature. Magnetic break layers may include CoX where X is Fe, Cr, Oxides, Ru, Cu, Pt, C, BN, Cr, etc., where X is selected such that the alloy is magnetic, e.g., Co-10Cu-24Pt-5B-8Ru, Co-9Pt-10Cr-20Ru-6B, etc. Magnetic break layers may include FeX where X is Co, Cr, Oxides, Ru, Cu, Pt, C, BN, Cr, etc., where X is selected such that the alloy is magnetic, e.g., 31Fe-36Pt-12Cu-9C-12BN, Fe20.5-PT22.5-Cu7-C44.5-B5.5, etc.

The break layers 130, . . . , 134 may further tune the ECC interaction between the write layers, e.g., write layer 120, . . . , 124. In some embodiments, the break layers and variation in their thickness, composition, growing condition, etc., may affect the intensity and/or directionality of the exchange interaction among the write layers that are magnetic, providing extra degrees of freedom for the ECC interaction.

It is appreciated that the break layers 130, . . . , 134 may be continuous layer or one or more granular layers. For example, the break layers 130, . . . , 134 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof. According to some embodiments, the break layers 130, . . . , 134 maintain the granular structures, magnetization orientation and anisotropy between the storage layer 110 to the write layers 120, . . . , 124.

In some embodiments, the thickness of the write layers may range from 1-500 Å each while the thickness of the break layers range from 1-50 Å each. It is appreciated that each break layer may have a different composition and/or thickness than other break layers. For example, break layer 132 may have a different composition and/or thickness than the break layer 134 while it may have the same composition as the break layer 133 that has the same thickness as the break layer 134. In some embodiments, at least two break layers have a different composition from one another. In some embodiments, at least two break layers have a different thickness form one another.

Figure 1C:
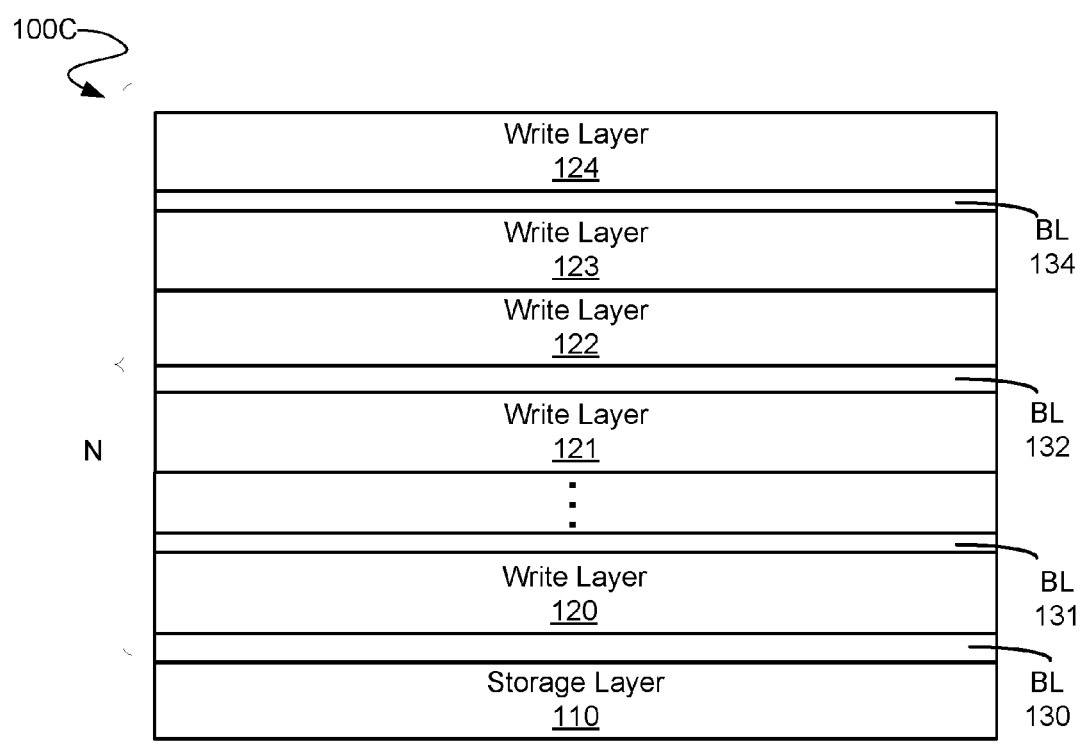

Referring now to FIG. 1C, a HAMR media 100C in accordance with one aspect of the present embodiments is shown. The HAMR media 100C is substantially similar to that of FIG. 1B except that there is not necessarily a one to one correspondence between the write layers and the break layers. For example, the write layer 123 may be in direct contact with the write layer 122 without any break layers in between. It is appreciated that the number of break layers shown and their position between the write layers is for illustrative purposes and not intended to limit the scope of the embodiments. For example, in some embodiments, the write layer 120 may be in direct contact with other write layers, e.g., write layer 121, without any break layers in between, e.g., without break layer 131.

Figure 2A:
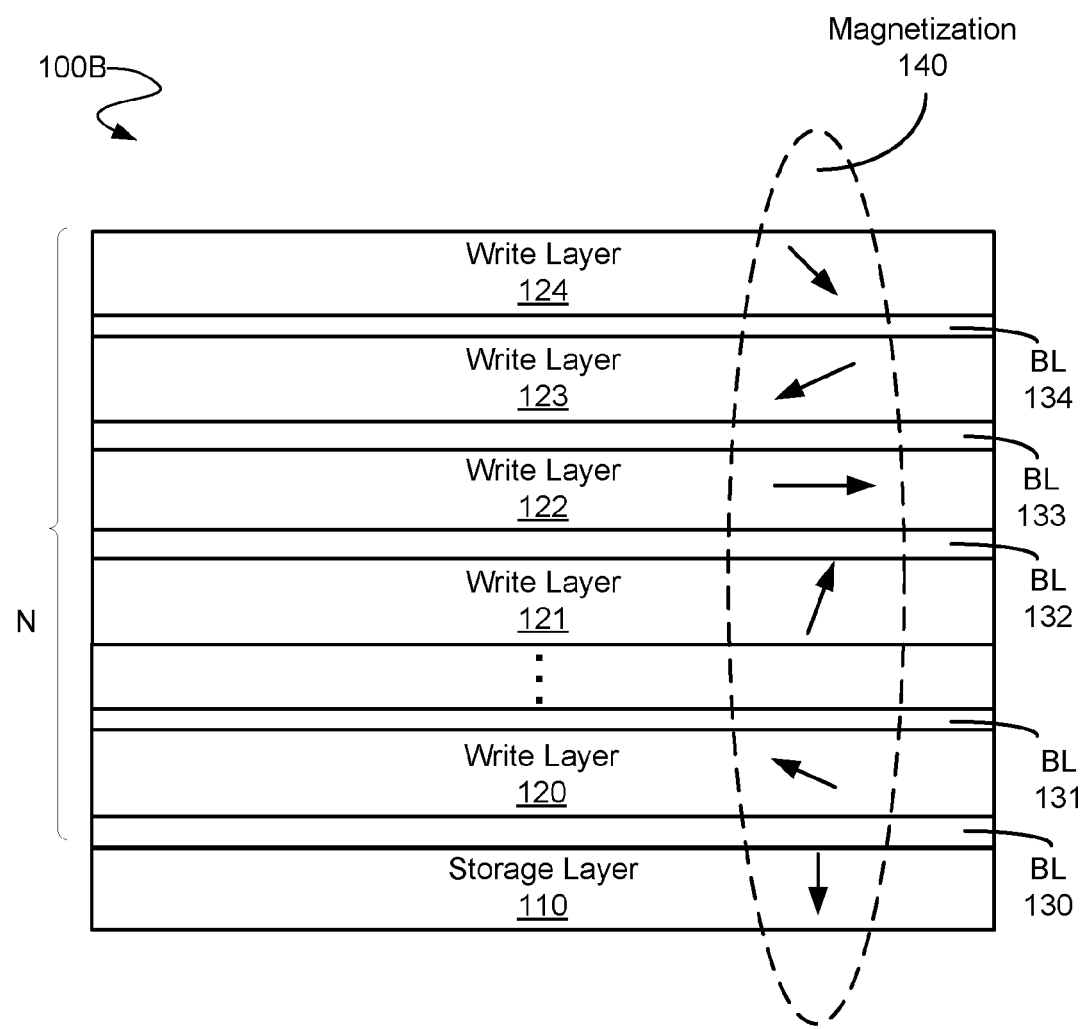
FIGS. 2A-2I show the HAMR media that undergoes a write process according to one aspect of the present embodiments.

FIGS. 2A-2I show the HAMR media 100B that undergoes a write process according to one aspect of the present embodiments. FIG. 2A depicts a state prior to the HAMR write process. As such, each layer may have a magnetization orientation 140 of its own or it may be aligned due to exchange coupling between any two layers. It is appreciated that FIG. 2A may be directed to a period prior to the current HAMR write process but it may be directed to a previously write HAMR process. It is appreciated that if the HAMR media 100B has been written to in the past, then the magnetization orientations 140 may be more aligned with one another, e.g., all substantially face down, all substantially face up, etc.

Figure 2B:
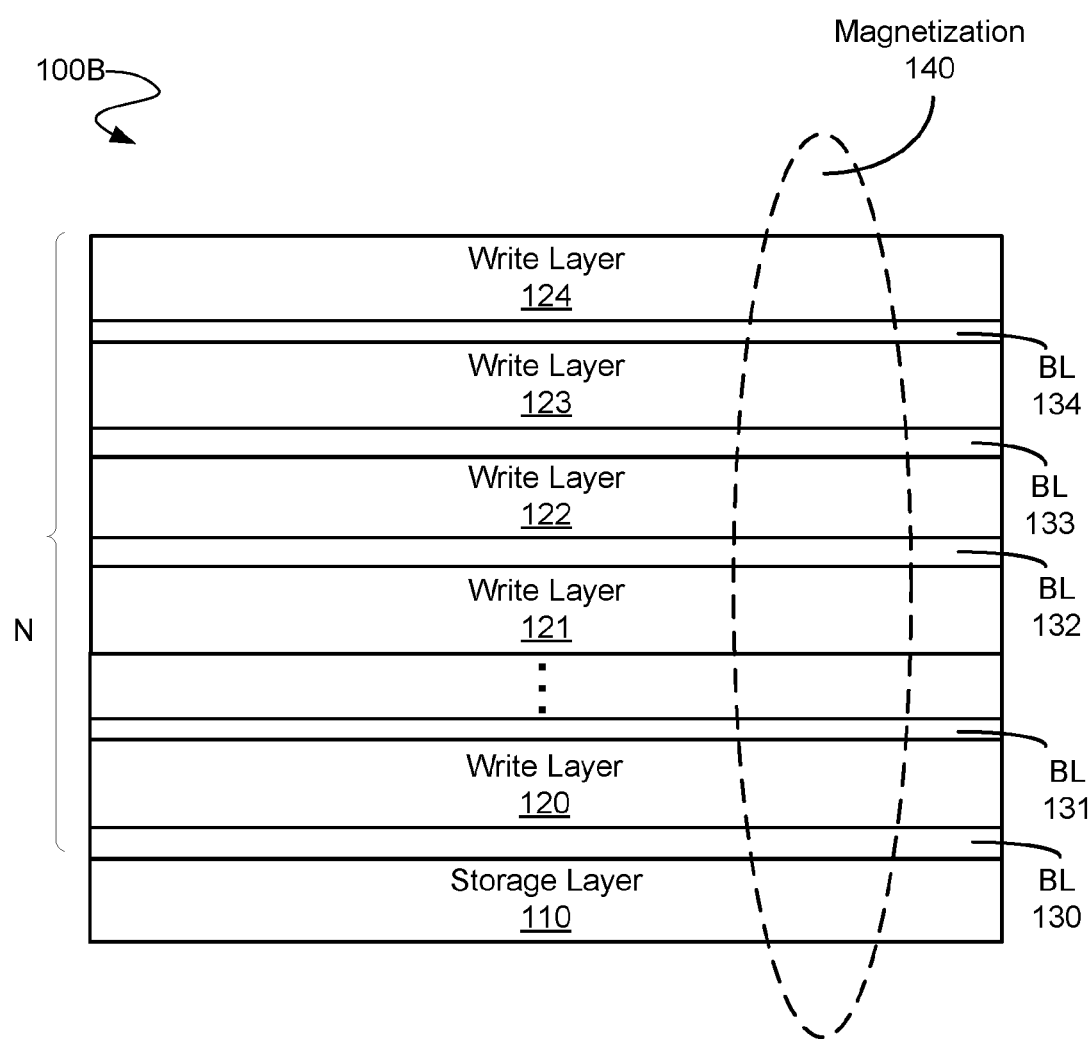

Referring now to FIG. 2B, the HAMR media 100B is heated above the highest Curie temperature between the write layers 120, . . . , 124 and the storage layer 110. Accordingly, the magnetization orientation of the write layers 120, . . . , 124 and the storage layer 110 is substantially removed. In other words, the write layers 120, . . . , 124 and the storage layer 110 become non-magnetic at or above the highest Curie temperature among the layers.

Figure 2C:
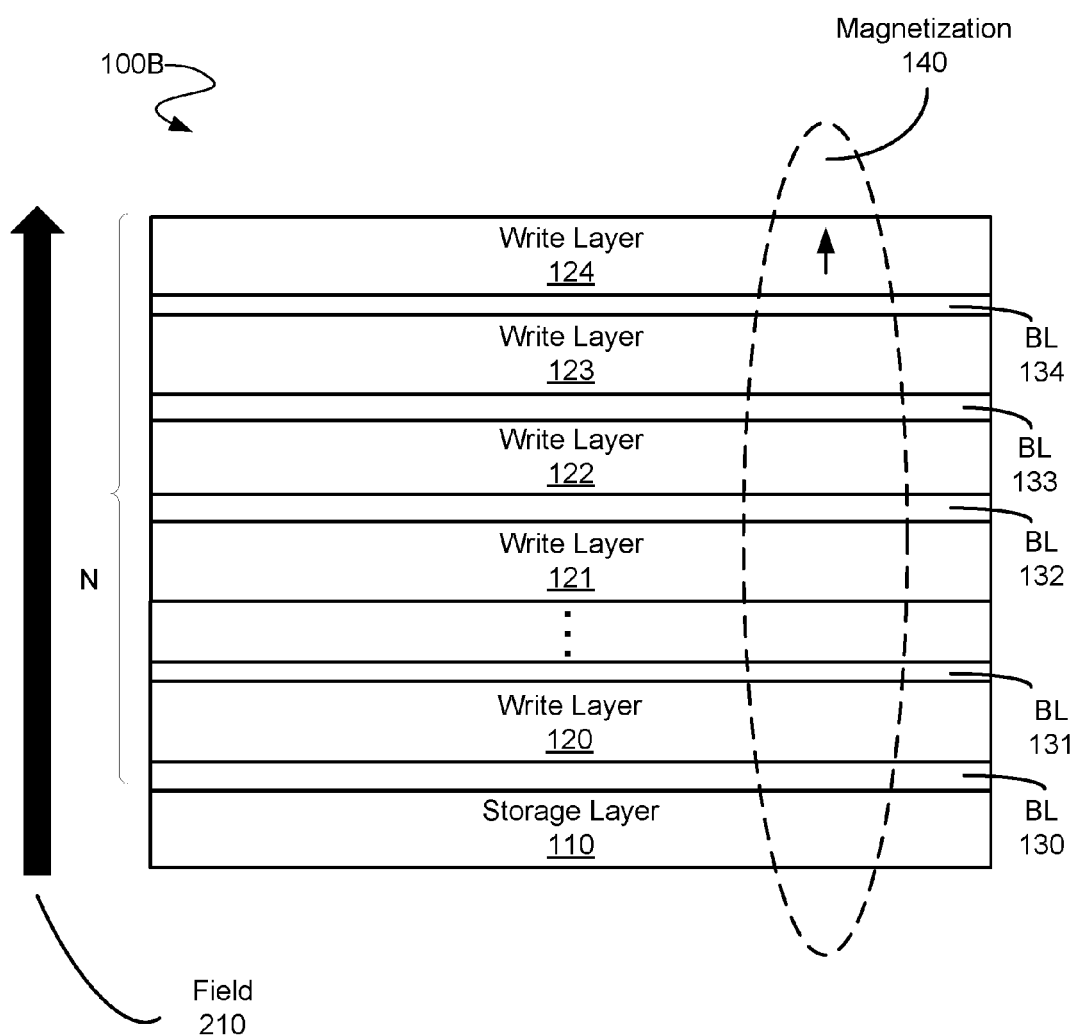

Referring now to FIG. 2C, the HAMR media 100B is cooling off the highest Curie temperature between the write layers 120, . . . , 124 and the storage layer 110. In other words, the temperature is at the writing temperature (slightly below the Curie temperature). Moreover, the external magnetic field 210 is applied. Due to the gradient of the anisotropy field and the magnetization field in the write layers, at write temperature, the magnetic field orientation 140 of the write layer 124 aligns with the orientation of the external magnetic field 210. It is appreciated that magnetic orientation of other write layers do not align at this stage.

Figure 2D:
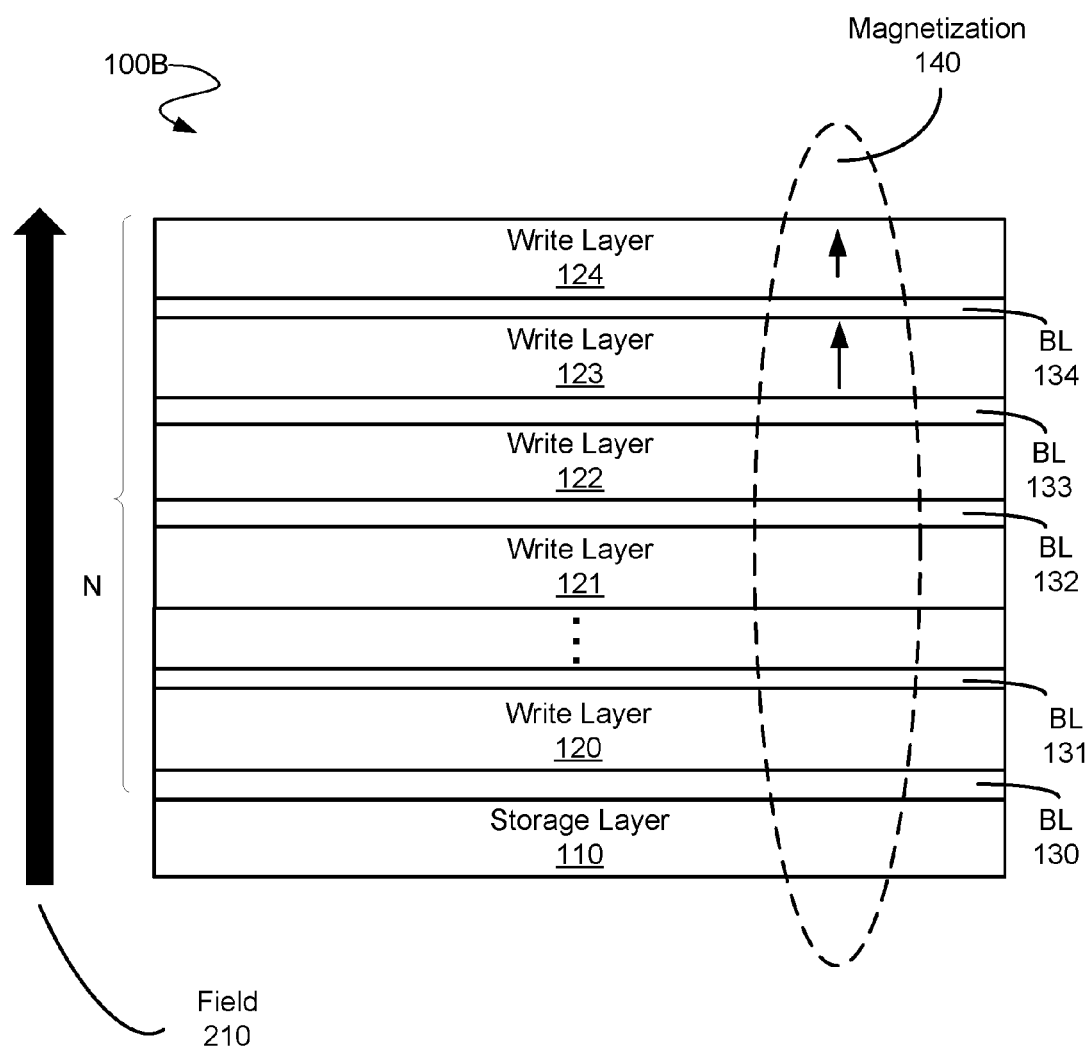
Figure 2E:
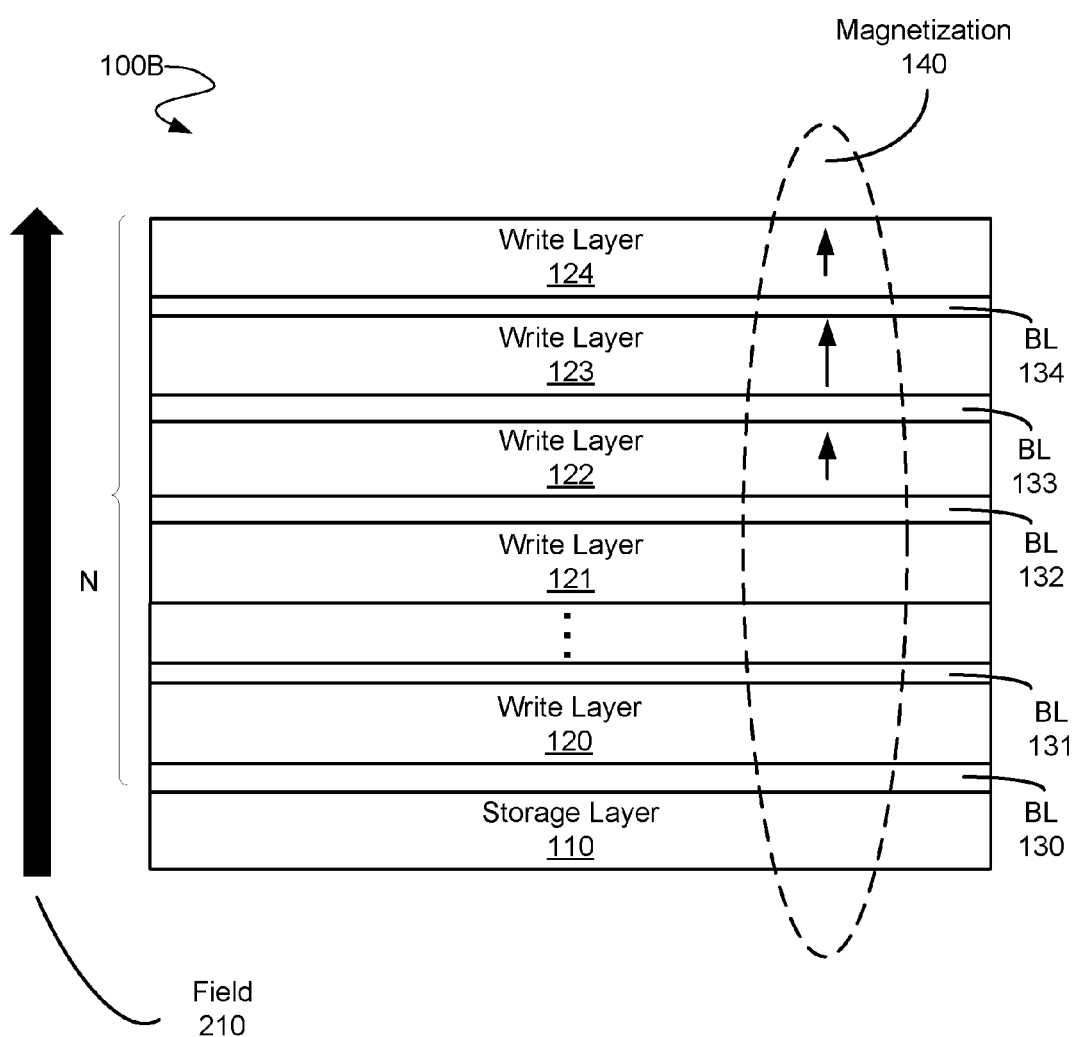
Figure 2F:
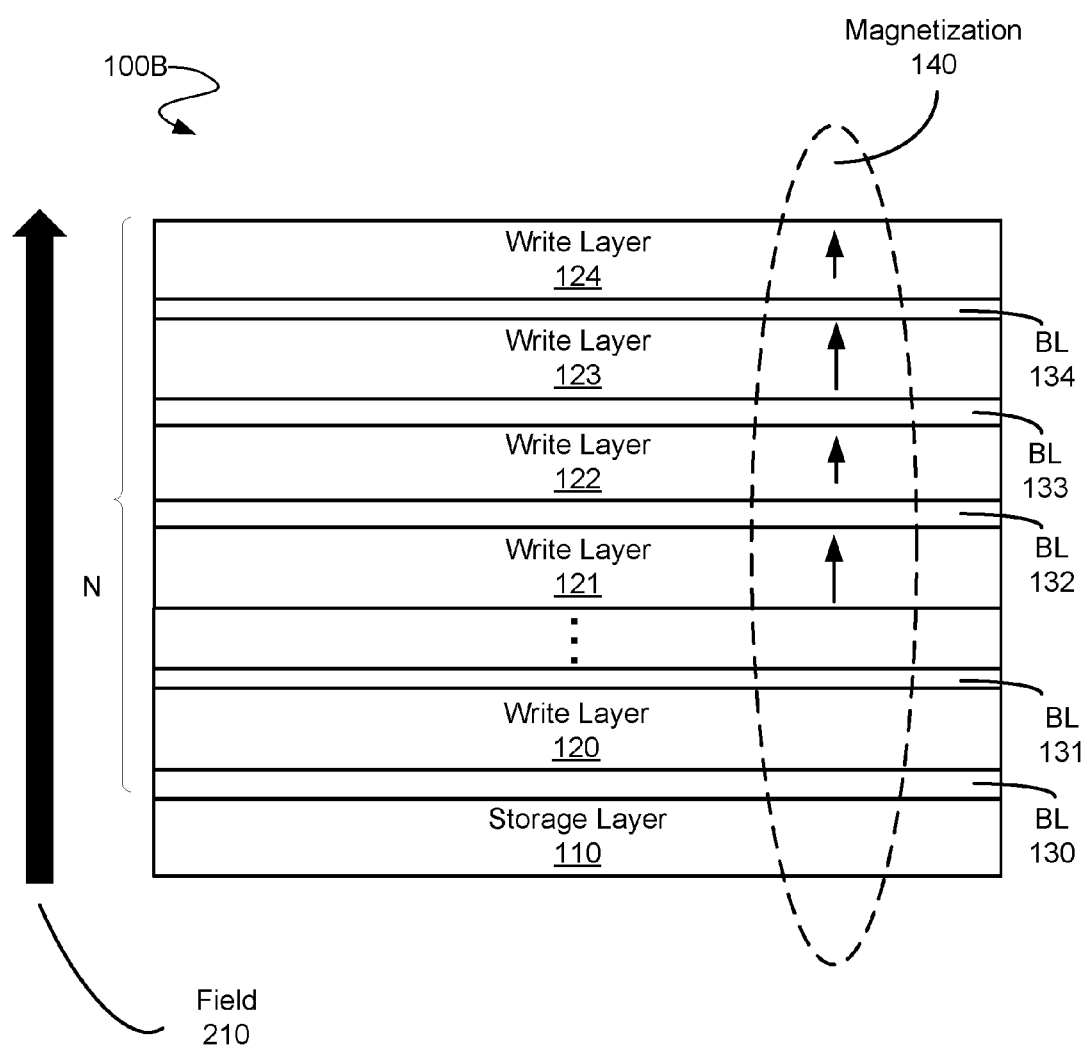
Figure 2G:
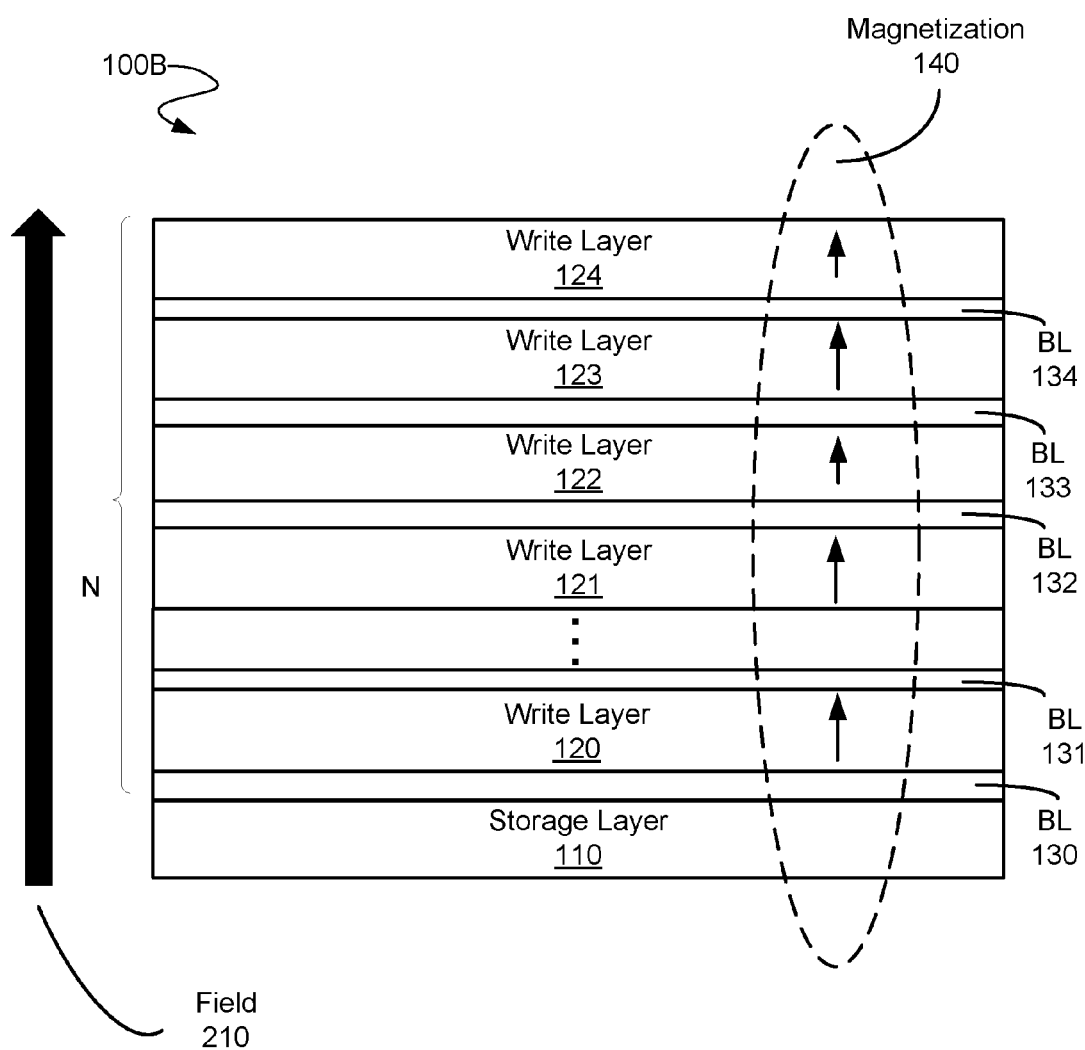
Figure 2H:
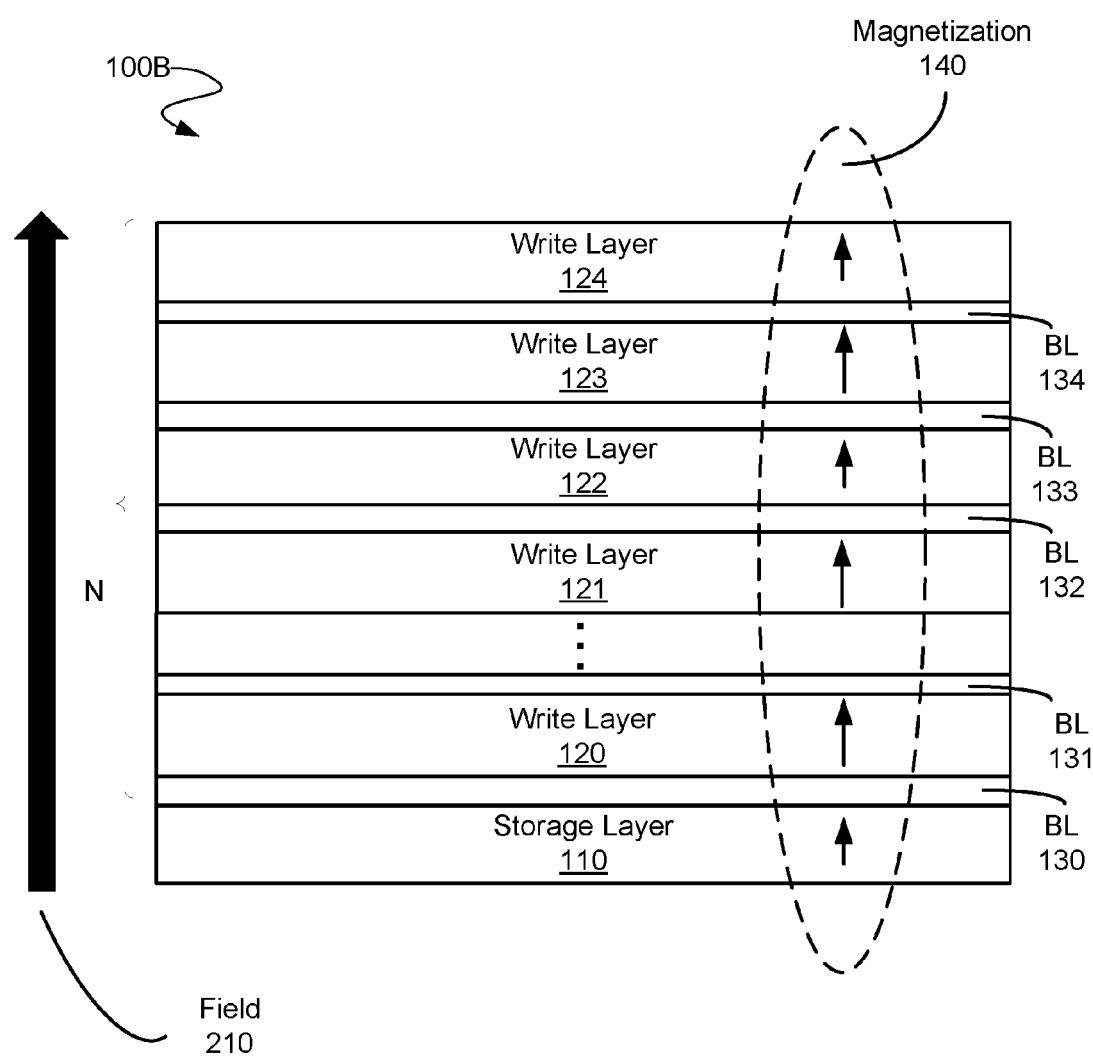
Figure 2I:
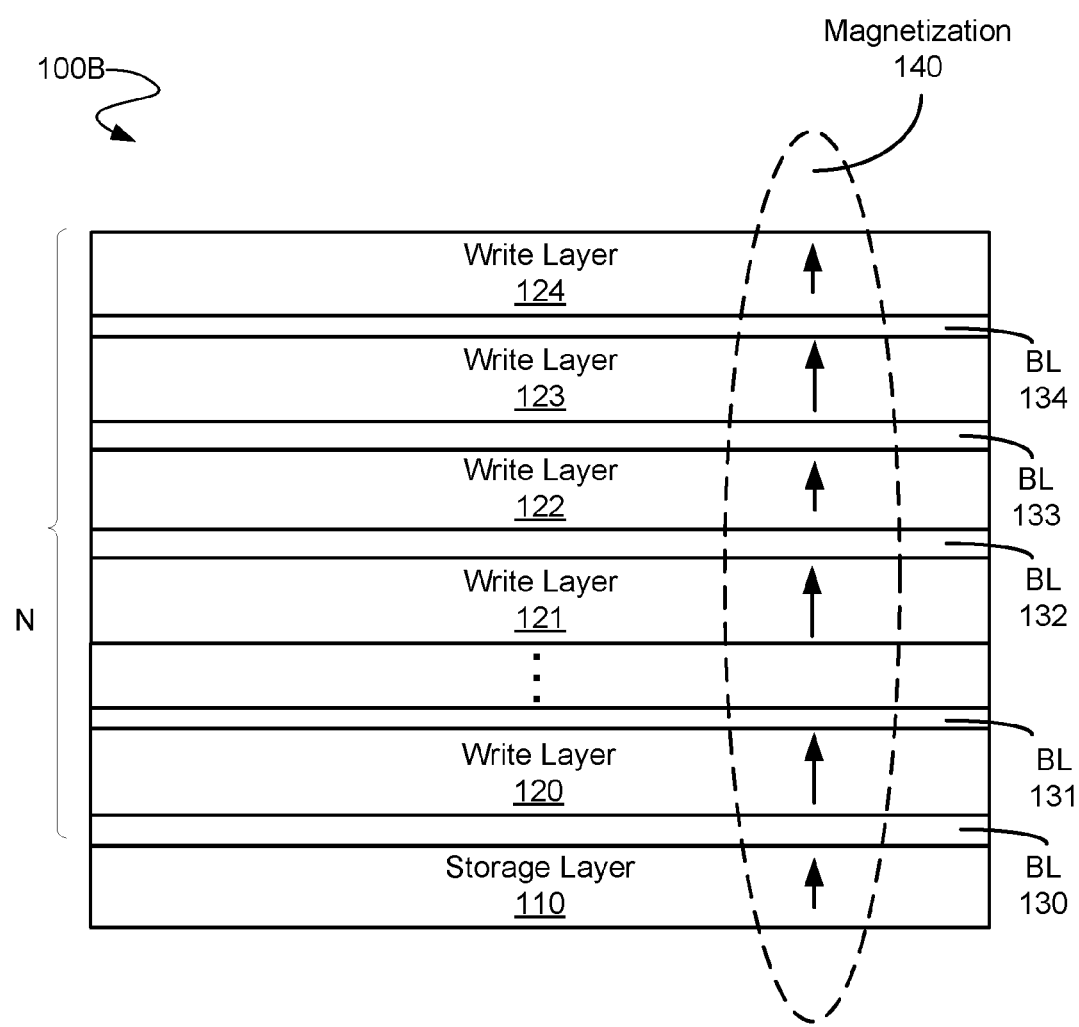

Referring now to FIG. 2D, the HAMR media 100B is further cooling down and the magnetic field orientation of the write layer 124 in addition to the external magnetic field 210 causes the magnetic field orientation 140 of the write layer 123 to align with the external magnetic field 210 because of the gradient of the anisotropy field and the magnetization field in the write layers at write temperature. This process repeats itself and cascades its way through the write layers. For example, referring now to FIG. 2E, the HAMR media 100B is further cooling down and the magnetic field orientation of the write layers 123 and 124 in addition to the external magnetic field 210 cause the magnetic field orientation 140 of the write layer 122 to align with the external magnetic field 210 because of the gradient of the anisotropy field and the magnetization field in the write layers at write temperature. Referring now to FIG. 2F, the HAMR media 100B is further cooling down and the magnetic field orientation of the write layers 122, 123 and 124 in addition to the external magnetic field 210 cause the magnetic field orientation 140 of the write layer 121 to align with the external magnetic field 210 because of the gradient of the anisotropy field and the magnetization field in the write layers at write temperature. Referring now to FIG. 2G, the HAMR media 100B is further cooling down and the magnetic field orientation of the write layers 121, 122, 123 and 124 in addition to the external magnetic field 210 cause the magnetic field orientation 140 of the write layer 120 to align with the external magnetic field 210 because of the gradient of the anisotropy field and the magnetization field in the write layers at write temperature. Referring now to FIG. 2H, the HAMR media 100B is further cooling down and the magnetic field orientation of the write layers 120, 121, 122, 123 and 124 in addition to the external magnetic field 210 cause the magnetic field orientation 140 of the storage layer 110 to align with the external magnetic field 210 because of the gradient of the anisotropy field and the magnetization field in the write layers at write temperature. At this stage, the media has cooled off to the freezing temperature and as such, once the external magnetic field 210 is removed, the magnetization orientation of the write layers 120, . . . , 124 and the storage layer 110 is maintained as shown in FIG. 2I.

It is appreciated that FIG. 2A-2I describe the writing process for the HAMR media 100B. It is appreciated that a similar process occurs for other HAMR media embodiments, e.g., HAMR media 100A and HAMR media 100C. As such, illustration of the writing process for the HAMR media 100B is for illustrative purposes and not intended to limit the scope of the embodiments. Furthermore, it is appreciated that FIGS. 2A-2I illustrates aligning of the magnetic orientation of the write layers with the external magnetic field in a sequence of steps but it is appreciated that those sequence of events may occur simultaneously and at the same time which subsequently assists the external magnetic field in orienting the magnetic field orientation of the storage layer.

Figure 3A:
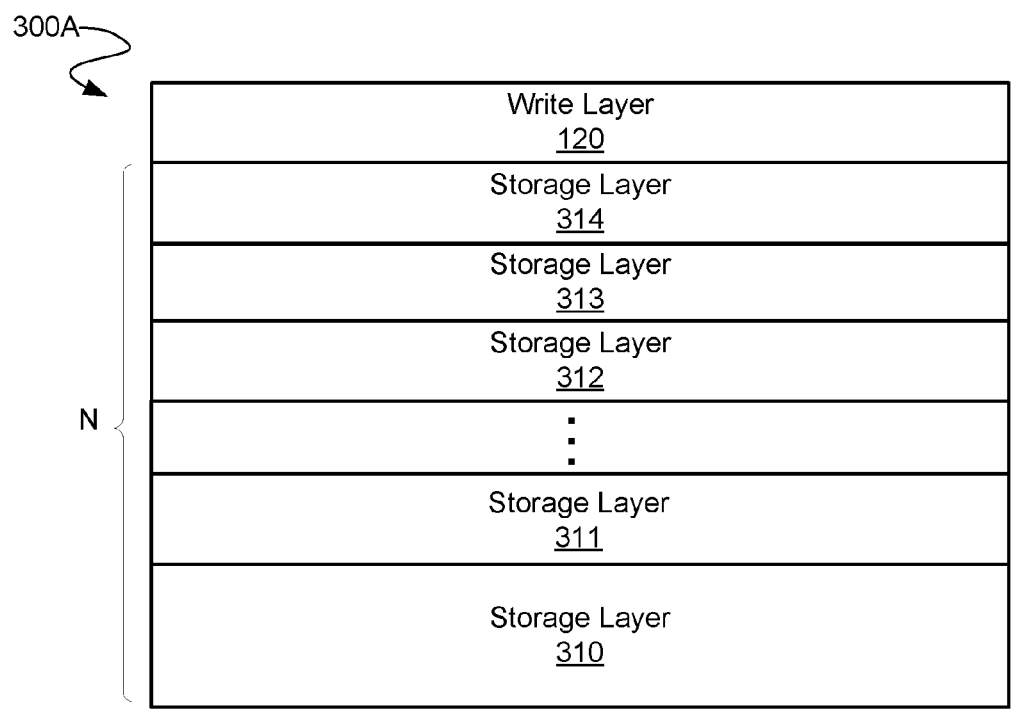
FIGS. 3A-3C show the HAMR media according to one aspect of the present embodiments.
Figure 3B:
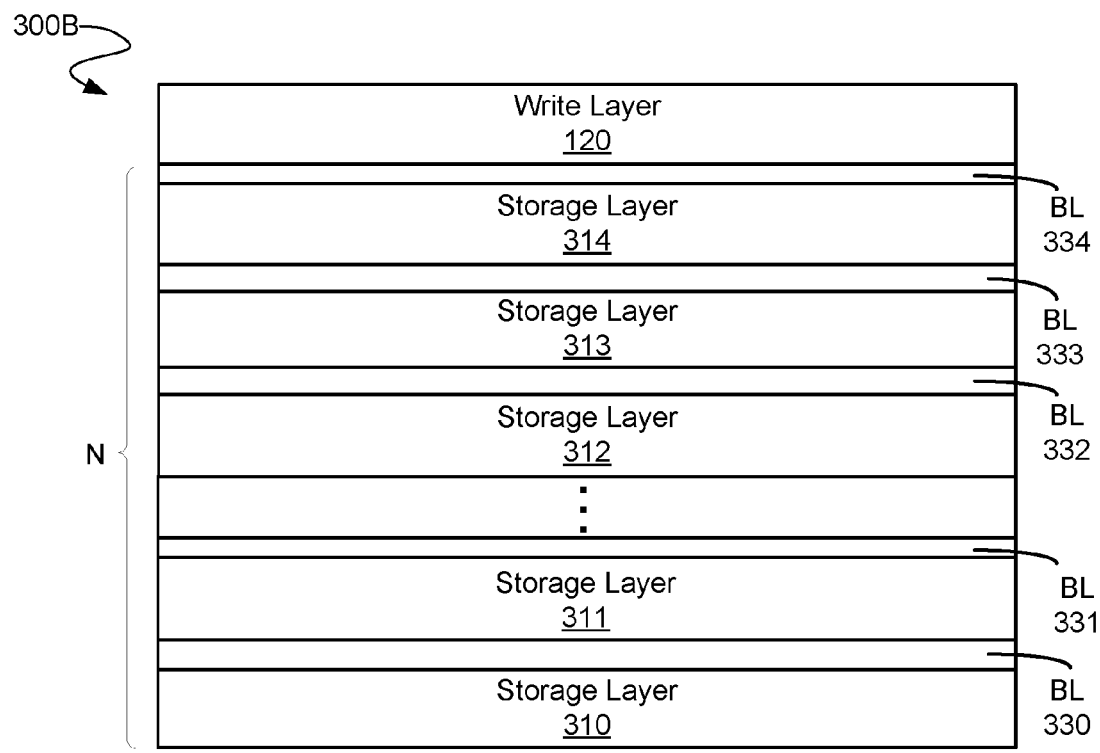
Figure 3C:
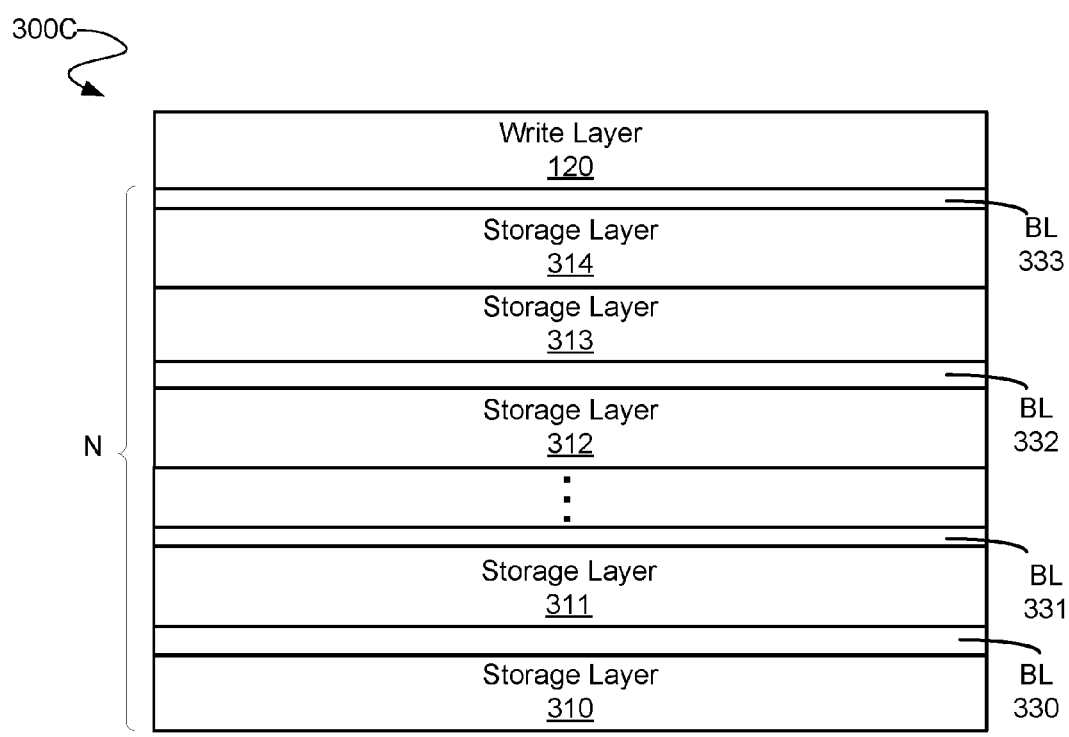

FIGS. 3A-3C show the HAMR media according to one aspect of the present embodiments. The HAMR media 300A is similar to that of FIG. 1A except that the storage layer is multiple storage layer and that the write layer is shown as a single write layer but may include as multiple write layers. The HAMR media 300A operates substantially similar to that of FIG. 1A.

The HAMR media 300A includes storage layer 310-314, e.g., FePt or an alloy thereof, one or more write layers, e.g., write layer 120. It is appreciated that the write layer 120 may include multiple write layers and may be similar to the structure of the write layers described in FIGS. 1A-1C and FIGS. 2A-2I. The write layer 120 is disposed over the top storage 314. In this embodiment, N storage layers are shown but it is appreciated that the number of storage layers are for illustrative purposes only and should not be construed as limiting the scope of the embodiments. It is appreciated that the storage layers 310-314 may be a continuous layer or one or more granular layers. For example, the storage layers 310-314 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof.

It is appreciated that at least two storage layers have different compositions in order to create a magnetization and anisotropy field gradient, at writing temperature. For example, in some embodiments, the storage layer 310 is different from the storage layer 312, the storage layer 310 is different from storage layer 311 which are both different from the storage layer 312, etc. It is appreciated that the storage layers 310, . . . , 314 have a lower anisotropy field and magnetization, at writing temperature, in comparison to the write layer 120. It is appreciated that the anisotropy field and magnetization associated with the storage layer 310 is approximately zero at the writing temperature.

In some embodiments, the storage layer 310, . . . , 314 form a gradient for the anisotropy field and the magnetization at writing temperature. For example, in some embodiments, the anisotropy field and the magnetization of the write layer 314 may be greater than or equal to the storage layers 310, . . . , 313. Similarly, in some embodiments, the anisotropy field and the magnetization field and the magnetization of the storage layer 313 may be greater than or equal to the storage layers 310, . . . , 312. Similarly, in some embodiments, the anisotropy field and the magnetization field and the magnetization of the storage layer 312 may be greater than or equal to the storage layers 310, . . . , 311. Similarly, in some embodiments, the anisotropy field and the magnetization field and the magnetization of the storage layer 311 may be greater than or equal to the N storage layers and the storage layer 310. In other words, the storage layers 310, . . . , 314 form a anisotropy field and magnetization gradient at writing temperature. As such, in presence of an external magnetic field and at writing temperature, the storage layer(s) with the higher anisotropy field and magnetization, e.g., storage layer 314, aligns with the external magnetic field before other storage layers, e.g., storage layer 310, . . . , 313. Once the storage layer 314 is aligned, it assists the external magnetic field in aligning other storage layers, e.g., storage layer 313. It is appreciated that the process continues until all storage layers are aligned with the external magnetic field which ultimately align the storage layer 310. It is further appreciated that in some embodiments, multiple storage layers may align with the external magnetic field at the same time which assist the external magnetic field to subsequently align the magnetic orientation of the bottom most storage layer with that of the external magnetic field.

When the media starts cooling down the stability and the alignment of the magnetization of the write layer(s) and the storage layers are maintained until the freezing temperature (temperature at which the magnetization of the storage layer cannot be switched by the external magnetic field) is reached. It is appreciated that the magnetic orientation of the write layers and the magnetic orientation of the storage layer is maintained at freezing temperature, therefore retaining (storing) information therein.

It is appreciated that a thickness of each of the storage layers 310-314 may range between 1-500 Å (inclusive). It is appreciated that the storage layers may have different thicknesses from one another. For example, a thickness of the storage layer 314 may be different from the thickness of the storage layer 313, etc.

Referring now to FIG. 3B, a HAMR media 300B in accordance with one aspect of the present embodiments is shown. The HAMR media C00B is substantially similar to that of FIG. 3A. In embodiment 300B, the storage layers 310, . . . , 314 are separated from one another as well as the write layer 120 using break layers 330, 331, 332, 333, and 334. For example, the storage layer 314 may be separated from the write layer 120 via the break layer 334. Moreover, the storage layer 310 may be separate from other storage layers via the break layer 330. Similarly, the storage layer 311 may be separated from the storage layer 312 via the break layer 331, etc.

It is appreciated that the break layers may be nonmagnetic according to some embodiments. For example, the break layers 330, . . . , 334 may include FeX, wherein X is Co, Cr, Oxide, Ru, Cu, Pt, Cr, BN, Nitride, C, B, etc., and where the composition of X is selected such that FeX is nonmagnetic. In some embodiments, the break layers may include FeCoX where X is Cr, Ru, Cu, Pt, Cr, BN, Oxide, Nitride, C, B, etc., where the composition of X is selected such that FeCoX is nonmagnetic. In some embodiments, the break layers may be nonmagnetic and it may include CoX where X is Fe, Cr, Oxides, Ru, Cu, Pt, C, BN, Cr, etc., and where X is selected such that the alloy is nonmagnetic. It is appreciated that in some embodiments, the break layers may be slightly magnetic relative to the surrounding layers, at the writing temperature. Magnetic break layers may include CoX where X is Fe, Cr, Oxides, Ru, Cu, Pt, C, BN, Cr, etc., where X is selected such that the alloy is magnetic, e.g., Co-10Cu-24Pt-5B-8Ru, Co-9Pt-10Cr-20Ru-6B, etc. Magnetic break layers may include FeX where X is Co, Cr, Oxides, Ru, Cu, Pt, C, BN, Cr, etc., where X is selected such that the alloy is magnetic, e.g., 31Fe-36Pt-12Cu-9C-12BN, Fe20.5-PT22.5-Cu7-C44.5-B5.5, etc.

The break layers 330, . . . , 334 may further tune the ECC interaction between the storage layers, e.g., storage layer 310, . . . , 314. In some embodiments, the break layers and variation in their thickness, composition, growing condition, etc., may affect the intensity and/or directionality of the exchange interaction among the write layers that are magnetic, providing extra degrees of freedom for the ECC interaction.

It is appreciated that the break layers 330, . . . , 334 may be continuous layer or one or more granular layers. For example, the break layers 330, . . . , 334 may include grain decoupling material, e.g., C, carbide such as SiC, BC, TiC, TaC, etc., nitride such as BN, SiN, TiN, TaN, etc., oxide such as $SiO_2$, $B_2O_3$, $Ta_2O_5$, $TiO_2$, $WO_3$, $TaO_5$, $TiO_3$, etc., or any combination thereof. According to some embodiments, the break layers 330, . . . , 334 maintain the granular structures, magnetization orientation and anisotropy between the storage layers 310-314 to the write layer 120.

In some embodiments, the thickness of the storage layers may range from 1-500 Å each while the thickness of the break layers range from 1-50 Å each. It is appreciated that each break layer may have a different composition and/or thickness than other break layers. For example, break layer 332 may have a different composition and/or thickness than the break layer 334 while it may have the same composition as the break layer 333 that has the same thickness as the break layer 334. In some embodiments, at least two break layers have a different composition from one another. In some embodiments, at least two break layers have a different thickness form one another.

Referring now to FIG. 3C, a HAMR media 300C in accordance with one aspect of the present embodiments is shown. The HAMR media 300C is substantially similar to that of FIG. 3B except that there is not necessarily a one to one correspondence between the write layers and the break layers. For example, the storage layer 313 may be in direct contact with the storage layer 314 without any break layers in between. It is appreciated that the number of break layers shown and their position between the storage layers is for illustrative purposes and not intended to limit the scope of the embodiments. For example, in some embodiments, the storage layer 310 may be in direct contact with other storage layers, e.g., storage layer 311, without any break layers in between, e.g., without break layer 331.

Figure 4:
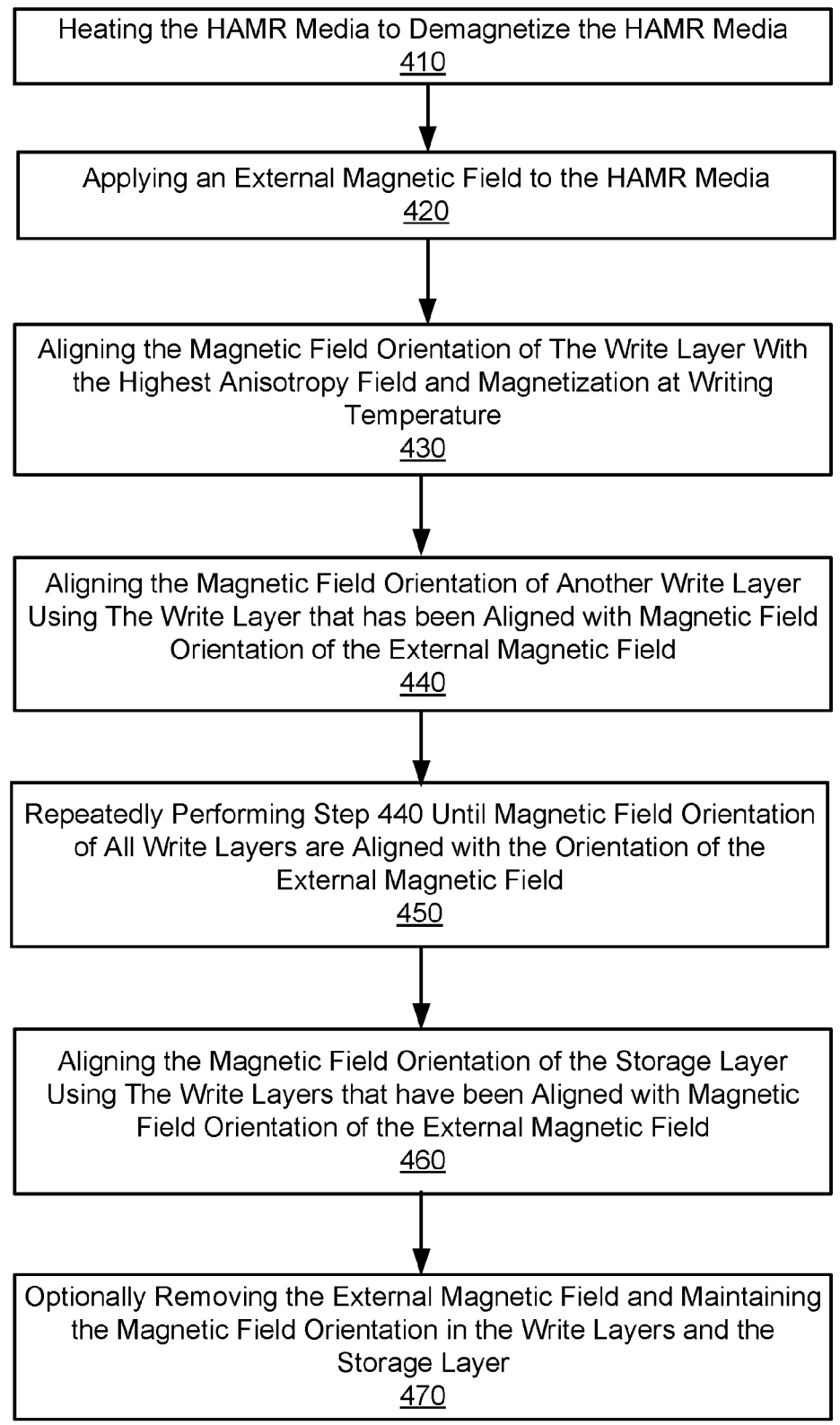
FIG. 4 shows a flow diagram for a HAMR media that undergoes a write process according to one aspect of the present embodiments.

Referring now to FIG. 4, a flow diagram for a HAMR media that undergoes a write process according to one aspect of the present embodiments is shown. At step 410, the layers of the HAMR media are at least partially or completely demagnetized by heating the HAMR media. For example, the storage layer, the break layers, and the write layers may be heated to the Curie temperature of the layer with the highest Curie temperature in order to be substantially demagnetized. At step 420, as the media is cooling off (writing temperature), an external magnetic field is applied to the HAMR media. At step 430, the magnetic orientation of the write layer of HAMR media with the highest anisotropy field and magnetization (e.g., top write layer 124), at writing temperature, is aligned with that of the external magnetic field. At step 440, the magnetic field orientation of another write layer, e.g., write layer 123, is aligned with that of the external magnetic field using the already aligned magnetic field orientation of the write layer with the highest anisotropy field and magnetization, e.g., write layer 124, at writing temperature. Thus, the magnetic field orientation of the write layer 124 assists the external magnetic field to orient the magnetic field orientation of the write layer 123 to align with that of the external magnetic field. In other words, the alignment of the magnetic field orientation of the write layer 124 with that of the external magnetic field has a cascading effect on the magnetic field orientation of subsequent write layers, e.g., write layer 123, due to anisotropy field and magnetization gradient, at writing temperature. It is appreciated that in some embodiments, the magnetic orientation of more than one write layer may be aligned with the external magnetic field at the same time.

At step 450, the process is repeated for other write layers. In other words, other write layers are similarly aligned with the external magnetic field using previously aligned write layers. The previously aligned write layers assist the external magnetic field to orient the magnetic orientation of other write layers that have a lower anisotropy field and magnetization, at write temperature. The process is repeated until at step 460, the magnetic field orientation of the storage layer is aligned with that of the write layers and the external magnetic field. At this point, freezing temperature, the apparatus is stable enough that the magnetic field orientation of the storage layer will not change in absence of the external magnetic field. As such, at step 470, the external magnetic field may be removed and the magnetic field orientation of the write layers and the storage layer may be maintained.

Accordingly, the gradient for the anisotropy field and magnetization of the write layers formed enables the write layer with the highest anisotropy field and magnetization at write temperature to pin other write layers, in presence of external magnetic field. The pinned write layers may subsequently pin other layers until the magnetic orientation of the storage layer is aligned with that of the external magnetic field. Because the apparatus has cooled off enough to reach the freezing temperature, the magnetic orientations of the write layers and the storage layer are maintained in absence of the external magnetic field.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   a storage layer;
   a first write layer disposed over the storage layer; and
   a second write layer disposed over the first write layer, wherein anisotropy field and magnetization associated with the second write layer at writing temperature is greater than anisotropy field and magnetization associated with the first write layer at the writing temperature.

2. The apparatus of claim 1, wherein a material of the storage layer includes FePt.

3. The apparatus of claim 1, wherein a material of the first write layer and a material of the second write layer comprises CoPt.

4. The apparatus of claim 1, wherein a material of the first write layer comprises CoPtX, wherein X is selected from a group consisting of Cr, B, BN, $WO_3$, $Ta_2O_5$, $SiO_2$, $CrO_3$, CoO, and TiO, and wherein a material of the second write layer comprises CoPtX, wherein X is selected from a group consisting of Cr, B, BN, $WO_3$, $Ta_2O_5$, $SiO_2$, $CrO_3$, CoO, and TiO.

5. The apparatus of claim 1, wherein a thickness of the storage layer ranges from 1-500 Å.

6. The apparatus of claim 1, wherein a thickness of the first write layer and the second write layer range from 1-500 Å.

7. The apparatus of claim 1, wherein anisotropy field and magnetization associated with the storage layer is approximately zero at the writing temperature.

8. The apparatus of claim 1, wherein magnetization of the second write layer aligns with an external magnetic field at the writing temperature, wherein magnetization of the first write layer aligns with the external magnetic field at the writing temperature, and wherein magnetization of the storage layer aligns with the external magnetic field subsequent to the second write layer and the first write layer aligning with the external magnetic field.

9. An apparatus comprising:
a storage layer;
a first break layer disposed over the storage layer;
a first write layer disposed over the first break layer;
a second break layer disposed over the first write layer; and
a second write layer disposed over the second break layer,
wherein anisotropy field and magnetization associated with the second write layer at writing temperature is greater than anisotropy field and magnetization associated with the first write layer at the writing temperature.

10. The apparatus of claim 9, wherein a material of the storage layer includes FePt.

11. The apparatus of claim 9, wherein a material of the first write layer and a material of the second write layer comprises CoPt.

12. The apparatus of claim 9, wherein a material of the first write layer comprises CoPtX, wherein X is selected from a group consisting of Cr, B, BN, $WO_3$, $Ta_2O_5$, $SiO_2$, $CrO_3$, CoO, and TiO, and wherein a material of the second write layer comprises CoPtX, wherein X is selected from a group consisting of Cr, B, BN, $WO_3$, $Ta_2O_5$, $SiO_2$, $CrO_3$, CoO, and TiO.

13. The apparatus of claim 9, wherein a thickness of the first write layer and the second write layer range from 1-500 Å, and wherein a thickness of the first break layer and the second break layer range from 1-50 Å.

14. The apparatus of claim 9, wherein magnetization of the second write layer aligns with an external magnetic field at the writing temperature, wherein magnetization of the first write layer aligns with the external magnetic field at the writing temperature, and wherein magnetization of the storage layer aligns with the external magnetic field subsequent to the second write layer and the first write layer aligning with the external magnetic field.

15. The apparatus of claim 9, wherein the first break layer is nonmagnetic and wherein the second break layer is nonmagnetic, and wherein a material of the first break layer includes FeX, wherein X is selected from a group consisting of Co, Cr, Oxide, Nitride, C and B, and wherein a material of the second break layer includes FeX, wherein X is selected from a group consisting of Co, Cr, Oxide, Nitride, C and B.

16. The apparatus of claim 9, wherein a thickness of the first break layer is different from a thickness of the second break layer, and wherein a thickness of the first write layer is different from a thickness of the second write layer.

17. An apparatus comprising:
a storage layer;
a break layer; and
a plurality of write layers, wherein the break layer and the plurality of write layers are disposed over the storage layer,
wherein anisotropy field and magnetization associated with the plurality of write layers, at writing temperature, increases or remains the same for write layers of the plurality of write layers further away from the storage layer in comparison to write layers of the plurality of write layers closer to the storage layer, to form an anisotropy field and magnetization gradient for the plurality of write layers at the writing temperature.

18. The apparatus of claim 17, wherein the break layer is nonmagnetic, and wherein a material of the break layer includes FeX, wherein X is selected from a group consisting of Co, Cr, Oxide, Nitride, C and B, and wherein the break layer is disposed between two write layers of the plurality of write layers.

19. The apparatus of claim 17, wherein the break layer is nonmagnetic, and wherein a material of the break layer includes FeX, wherein X is selected from a group consisting of Co, Cr, Oxide, Nitride, C and B, and wherein the break layer is disposed over the storage layer and below a bottom write layer of the plurality of write layers.

20. The apparatus of claim 17, wherein a material of the storage layer includes FePt, and wherein a material of a first write layer of the plurality of write layers comprises CoPtX, wherein X is selected from a group consisting of Cr, B, BN, $WO_3$, $Ta_2O_5$, $SiO_2$, $CrO_3$, CoO, and TiO, and wherein a material of a second write layer of the plurality of write layers comprises CoPtX, wherein X is selected from a group consisting of Cr, B, BN, $WO_3$, $Ta_2O_5$, $SiO_2$, $CrO_3$, CoO, and TiO.

21. The apparatus of claim 17, wherein magnetization of the plurality of write layers aligns with an external magnetic field at the writing temperature, and wherein magnetization of the storage layer aligns with the external magnetic field subsequent to the plurality of write layers aligning with the external magnetic field.

* * * * *